US012643097B2

(12) United States Patent
Camus et al.

(10) Patent No.: US 12,643,097 B2
(45) Date of Patent: Jun. 2, 2026

(54) SUPPORT FOR ANALYSING BY MICROSCOPE A LIQUID-BASED BIOLOGICAL SUBSTANCE AND SYSTEM COMPRISING SUCH A SUPPORT AND A MICROSCOPE

(71) Applicant: IMV TECHNOLOGIES, Saint Ouen sur Iton (FR)

(72) Inventors: Agnes Camus, Sainte Gauburge Sainte Colombe (FR); Eric Schmitt, Villaines-la-Juhel (FR)

(73) Assignee: IMV TECHNOLOGIES, Saint Ouen sur Iton (FR)

( * ) Notice: Subject to any disclaimer, the term of this patent is extended or adjusted under 35 U.S.C. 154(b) by 537 days.

(21) Appl. No.: 18/258,916

(22) PCT Filed: Dec. 13, 2021

(86) PCT No.: PCT/FR2021/052305
§ 371 (c)(1),
(2) Date: Jun. 22, 2023

(87) PCT Pub. No.: WO2022/136766
PCT Pub. Date: Jun. 30, 2022

(65) Prior Publication Data
US 2024/0042433 A1 Feb. 8, 2024

(30) Foreign Application Priority Data
Dec. 22, 2020 (FR) ...................................... 2013942

(51) Int. Cl.
*B01L 3/00* (2006.01)
*G01N 21/03* (2006.01)

(52) U.S. Cl.
CPC ........ *B01L 3/502715* (2013.01); *G01N 21/03* (2013.01); *B01L 2200/025* (2013.01); (Continued)

(58) Field of Classification Search
CPC ........ B01L 3/502715; B01L 2200/025; B01L 2300/041; B01L 2300/0816; (Continued)

(56) References Cited

U.S. PATENT DOCUMENTS

| | | | |
|---|---|---|---|
| 6,551,554 B1 | 4/2003 | Vermeiden et al. | |
| D566,849 S | 4/2008 | Vermeiden | |
| (Continued) | | | |

FOREIGN PATENT DOCUMENTS

| | | |
|---|---|---|
| EP | 1291441 A2 | 3/2003 |
| EP | 3222994 A1 | 9/2017 |
| EP | 0809815 B1 | 5/2022 |

*Primary Examiner* — Charles S Chang
(74) *Attorney, Agent, or Firm* — FisherBroyles, LLP; Roger L. Browdy; Ronni S. Jillions

(57) ABSTRACT

The support comprises an object-carrying slide (11) and a cover glass (12) secured by lines of adhesive (13) peripherally defining individual compartments (14) for receiving a sample of the biological substance; characterised in that the upper face (17) of the object-carrying slide is bare and uncovered over at least one front marginal region (41) and at least one rear marginal region (42), each having an extension in the front-rear direction equal to at least 2.5 mm and an extension in the left-right direction equal to at least the distance between the respective axes of the two individual compartments furthest apart from one another. The system comprises the support (40) and a microscope for enclosing the support between a stage and a support plate provided with fingers, the distal ends of which are in contact with the marginal regions (41, 42) exclusively.

15 Claims, 10 Drawing Sheets

(52) U.S. Cl.
CPC . *B01L 2300/041* (2013.01); *B01L 2300/0816* (2013.01); *B01L 2300/088* (2013.01)

(58) Field of Classification Search
CPC ......... B01L 2300/088; B01L 3/502707; B01L 9/527; B01L 2200/0684; B01L 2200/0689; B01L 2200/12; B01L 2300/0609; B01L 2300/0654; B01L 2300/0822; B01L 2300/0887; B01L 2400/0406; B01L 3/5027; G01N 21/03; G01N 15/075; G01N 15/1433; G01N 15/01; G01N 15/1434; G01N 2015/1006; G01N 2015/1454; G01N 2015/1027; G01N 2015/1486; G02B 21/34
See application file for complete search history.

(56) References Cited

U.S. PATENT DOCUMENTS

| | | |
|---|---|---|
| 2003/0190744 A1 | 10/2003 | McGarry et al. |
| 2019/0233887 A1* | 8/2019 | Hoshizaki ............ C12Q 1/6874 |

* cited by examiner

SUPPORT FOR ANALYSING BY MICROSCOPE A LIQUID-BASED BIOLOGICAL SUBSTANCE AND SYSTEM COMPRISING SUCH A SUPPORT AND A MICROSCOPE

TECHNICAL FIELD OF THE INVENTION

The invention relates to analysing by microscope a liquid-based biological substance such as animal semen. The invention relates more particularly to a support for such a substance, intended to be mounted in a microscope configured to implement such an analysis, as well as a system including such a support and such a microscope.

PRIOR ART

There is already known, in particular through the European patent EP 0 809 815, to which the American patent U.S. Pat. No. 6,551,554 corresponds, as well as through the American design patent U.S. D566,849 S, a support for analysing by microscope if a liquid-based biological substance, such as animal semen, including an object-carrying slide, a cover glass and lines of adhesive disposed between the object-carrying slide and the cover glass to secure them to each other while peripherally delimiting individual compartments for receiving a sample of said biological substance; the object-carrying slide being parallelepipedal and having two principal faces, namely an upper face and a lower face, and side faces that extend from one of the principal faces to the other, namely a left face, a right face, a front face and a rear face, with the distance between the left face and the right face being greater than the distance between the front face and the rear face, which is itself greater than the distance between the lower face and the upper face; said support having a left-right direction transverse to the left face and to the right face while it is parallel to the front face, to the rear face and to the principal faces, a front-rear direction transverse to the front face and to the rear face while it is parallel to the left face, to the right face and to the principal faces, and a bottom-top direction transverse to the principal faces while it is parallel to the side faces; the cover glass being parallelepipedal and having two principal faces, namely an upper face and a lower face, and side faces that extend from one of the principal faces to the other, namely a left face, a right face, a front face and a rear face; the lower face of the cover glass being facing the upper face of the object-carrying slide while the front face, the rear face, the left face and the right face of the cover glass are turned towards and at a distance from respectively the front face, the rear face, that the left face and the right face of the object-carrying slide; each said individual compartment being delimited in the bottom-top direction respectively by the upper face of the object-carrying slide and by the lower face of the cover glass and delimited peripherally by said lines of adhesive, each said individual compartment opening solely on one side onto a well and on the other side onto a vent, each well and each vent being delimited by said lines of adhesive, each well been turned towards one of the front face and rear face of the object-carrying slide and each vent being turned towards the other one of the front face and rear face of the object-carrying slide.

To analyse the biological substance, a drop thereof is deposited in each of the wells of the support. The drops are then each entrained by capillarity in the individual compartment with which the well communicates. The support is mounted in a microscope and the individual compartments are disposed one after the other under a lens to observe the substance.

There is also known a system including such a support and such a microscope including a lens, a stage on which the support rests with the lower face of the object-carrying slide against the stage and one of the individual compartments aligned with the lens. The microscope furthermore includes a frame on which the lens is mounted and on which the stage is mounted so as to be able to move in translation in the left-right direction of the support in order to be able to successively align the other individual compartments with the lens. The microscope furthermore includes a support plate and a clamping member configured to urge the support plate and the stage towards each other. The support plate is articulated on the stage so as to be able to be moved away from the support or folded over the support. The system is furthermore configured to focus the lens by autofocus.

SUMMARY OF THE INVENTION

The invention proposes, in a first aspect, a support similar to the one described above but with improved performances, in particular with regard to the positioning of the individual compartments with respect to the lens of the microscope.

The invention proposes for this purpose a support for analysing by microscope a liquid-based biological substance, such as animal semen, including an object-carrying slide, a cover glass and lines of adhesive disposed between the object-carrying slide and the cover glass to secure them to each other while peripherally delimiting individual compartments for receiving a sample of said biological substance; the object-carrying slide being parallelepipedal and having two principal faces, namely an upper face and a lower face, and side faces that extend from one of the principal faces to the other, namely a left face, a right face, a front face and a rear face, with the distance between the left face and the right face greater than the distance between the front face and the rear face, which is itself greater than the distance between the lower face and the upper face; said support having a left-right direction transverse to the left face and to the right face while it is parallel to the front face, to the rear face and to the principal faces, a front-rear direction transverse to the front face and to the rear face while it is parallel to the left face, to the right face and to the principal faces, and a bottom-top direction transverse to the principal faces while it is parallel to the side faces; the cover glass being parallelepipedal and having two principal faces, namely an upper face and a lower face, and side faces that extend from one of the principal faces to the other, namely a left face, a right face, a front face and a rear face; the lower face of the cover glass being facing the upper face of the object-carrying slide while the front face, the rear face, the left face and the right face of the cover glass are turned towards and at a distance from respectively the front face, the rear face, the left face and the right face of the object-carrying slide; each said individual compartment being delimited in the bottom-top direction respectively by the upper face of the object-carrying slide and by the lower face of the cover glass and delimited peripherally by said lines of adhesive, each said individual compartment opening solely on one side onto a well and on another side on to a vent, each well and each vent being delimited by said lines of adhesive, each well and each vent being turned towards one of the front face and rear face of the object-carrying slide and each vent being turned towards the other one of the front face and rear face of the object-carrying slide; characterised in that the upper face of the object-carrying slide is bare and uncovered over at least a front marginal region and over at least a rear marginal region, the front marginal region running along the front face of the object-carrying slide, the rear marginal region running along the rear face of the object-carrying slide, each of said front marginal region and rear marginal region having an extension in the front-rear direction at least equal to 2.5 mm and an extension in the left-right direction at least equal to the separation between the respective axes of the two individual compartments furthest away from each other and no more than the distance between the left face and the right face of the object-carrying slide.

By virtue of the marginal regions, it is possible to implement a positioning of the support according to the invention with respect to a microscope by pressing on the upper face of the object-carrying slide, rather than on its lower face as is done conventionally.

This allows a particularly precise positioning in the bottom-top direction of the sample to be analysed, since in this way uncertainty on the thickness of the object-carrying slide due to manufacturing tolerances is avoided.

It should be noted that the expression "bare" relating to the upper face of the object-carrying slide means that this upper face does not bear directly on it any locally added covering, such as lines of adhesive or of ink.

It should also be noted that the expression "uncovered" relating to the upper face of the object-carrying slide means that this upper face is not opposite any element (such as such as for example the cover slide) that might constitute an obstacle for another element moved close to the support in the bottom-top direction to come into contact with this upper face.

By virtue of the marginal regions, it is possible to directly access the upper face of the object-carrying slide in order to mechanically determine its position and thus determine the position of other elements, the position of which is fixed and/or known with respect to this upper face. It should be noted in particular that mechanically determining the position of the upper face amounts to mechanically determining the position of the individual compartments that the upper face delimits.

The invention is furthermore based on the observation that the optical quality of the surface of the object-carrying slide (necessary in order to interfere as little as possible with the light that passes through the slide to illuminate the sample present in the individual compartment) involves mechanical regularity of this surface that is favourable to sliding; and that it is in particular possible to exert a pressing on the surface while keeping an ability to slide on this surface.

The front and rear marginal regions can thus serve as sliding tracks for at least once pressing element—such as for example a finger as explained later—against which the upper face would be put in abutment through its marginal regions in order to have its position determined mechanically.

It should further be noted that the position of the marginal regions—namely along the front face and along the rear face—means that these regions are as far away as possible from each other, which is favourable to the precision of the mechanical determination of the positioning by the support elements and to stability during sliding.

With regard to the lower bound of the extension of the marginal regions in the front-rear direction—namely 2.5 mm —, the applicant determined that, because of the manufacturing tolerances of the various elements of the system, a value at least equal to 2.5 mm made it possible to guarantee that the support fingers remain solely in contact with the front and rear marginal regions, whatever the position of the stage in the left-right direction.

Particularly simple, convenient and economical advantageous features of the support according to the invention are presented below:

for at least one of the front marginal region and rear marginal region, the extension in the left-right direction it is equal to the distance between the left face and the right face of the object-carrying slide;

each well has an extension in the front-rear direction that is less than the extension in the front-rear direction of each of said front marginal region and rear marginal region;

the distance between the left face and the right face of the object-carrying slide is between 74.8 mm and 75.2 mm, the distance between the front face and the rear face of the object-carrying slide is between 24.8 mm and 25.2 mm, the distance between the left face in the right face of the cover glass is between 31.8 mm and 32.2 mm, and the distance between the front face and the rear face of the cover glass is between 16.8 mm and 16.2 mm; and/or all the wells are turned towards one of the front face and rear face of the object-carrying slide and all the vents are turned towards the other one of the front face and rear face of the object-carrying slide.

The invention proposes, in a second aspect, a system for analysing a liquid-based biological substance, including a support as described above and a microscope including a lens, a stage configured to receive the support in a first observation position in which the lower face of the object-carrying slide is against the stage and one of the individual compartments is aligned with the lens, a frame on which the lens is mounted in at least one fixed predetermined position and on which the stage is mounted so as to be able to move in translation in the left-right direction of the support in order to be able to successively align the other individual compartments with the lens, a support plate at least partially extending opposite the support, and a clamping member configured to urge the support plate and the stage towards each other so that the support is gripped between the support plate and the stage; the support plate being mounted fixed on the frame and including a base and support fingers projecting from the base towards the stage and the distal ends of which are in contact with the marginal regions exclusively, with at least two support fingers on one of the front marginal region and rear marginal region and at least one support finger on the other one of the front marginal region and rear marginal region; the stage having positioning stops for immobilising the support with respect to the stage in the left-right direction.

Since the support plate is mounted fixed on the frame and the upper face of the object-carrying slide is held against the support fingers by the stage, under the effect of the gripping member, the support fingers determine the position of the upper face with respect to the frame in the bottom-top direction.

It should be noted that in this way the position of the upper face with respect to the frame does not depend on the thickness (i.e. the distance between the lower face and the upper face) of the object-carrying slide.

When the stage translates in the left-right direction, the support fingers slide on the marginal regions. Since the extension of the marginal regions in the left-right direction is at least equal to the distance between the respective axes of the two individual compartments that are furthest away from each other, the fingers remain in contact with the marginal regions whatever the individual compartment aligned with the lens.

Thus the position of the upper face of the object-carrying slide in the bottom-top direction remains determined in the same way by the support fingers whatever the individual compartment aligned with the lens.

This makes it possible in particular, once the focusing of the lens has been done for a given individual compartment, to keep this focus for each of the other individual compartments.

This furthermore makes it possible to keep this focus for another support replacing a first support for which the focusing was done, since the position of the top face of this other support in the bottom-top direction will be determined by the support fingers in the same way as for the first support.

It should be noted that such a focusing can then correspond to a factory setting done during the manufacture of the microscope.

It should also be noted that, in the systems of the prior art, the mechanical reference surface is the surface of the stage on which the lower face of the object-carrying slide rests, so that the position of the upper face of the object-carrying slide depends on the thickness of the object-carrying slide, and that consequently these systems do not offer the advantages disclosed above.

Particularly simple, convenient and economical advantageous features of the system according to the invention are presented below:

the support plate includes four support fingers, including two support fingers in contact with the front marginal region and the other two support fingers in contact with the rear marginal region;

one of the stage and support plate has magnetic properties and the clamping member includes magnets secured to the other one of the stage and support plate;

the base has an opening through which the lens points onto the individual compartment aligned with the lens in said first observation position, at least two of the support fingers that are in contact with one and the same marginal region being disposed on either side of the opening;

the frame includes a mounting wall and the base includes two arms each projecting transversely from the mounting wall, extending facing each other and delimiting the opening, each arm being provided with two support fingers, including one finger in contact with the front marginal region and one finger in contact with the rear marginal region;

the clamping member includes magnets housed in said arms;

one of the stage and support plate has a ramp and the other one of the stage and support plate has a protrusion configured to cooperate with the ramp during the translation movement of the stage in the left-right direction so as to separate the stage from the support plate, counter to the force exerted by the clamping member, to a position in which the support is accessible for being able to be removed from the stage;

the stage is mechanically connected to the frame by a sliding pivot connection including a cylindrical guide longitudinally oriented in the left-right direction and a barrel mounted for sliding on the guide, with a clearance between the barrel and the guide; and/or the lens has a fixed focal distance.

The invention also relates to the use of a system as disclosed above wherein the liquid-based biological substance is animal semen and said analysis comprises a step of counting spermatozoa.

BRIEF DESCRIPTION OF THE FIGURES

The description of the invention will now be continued with the detailed description of example embodiments, given below by way of illustrative and non-limitative examples, with reference to the accompanying drawings. On these.

DETAILED DESCRIPTION

Figure 1:
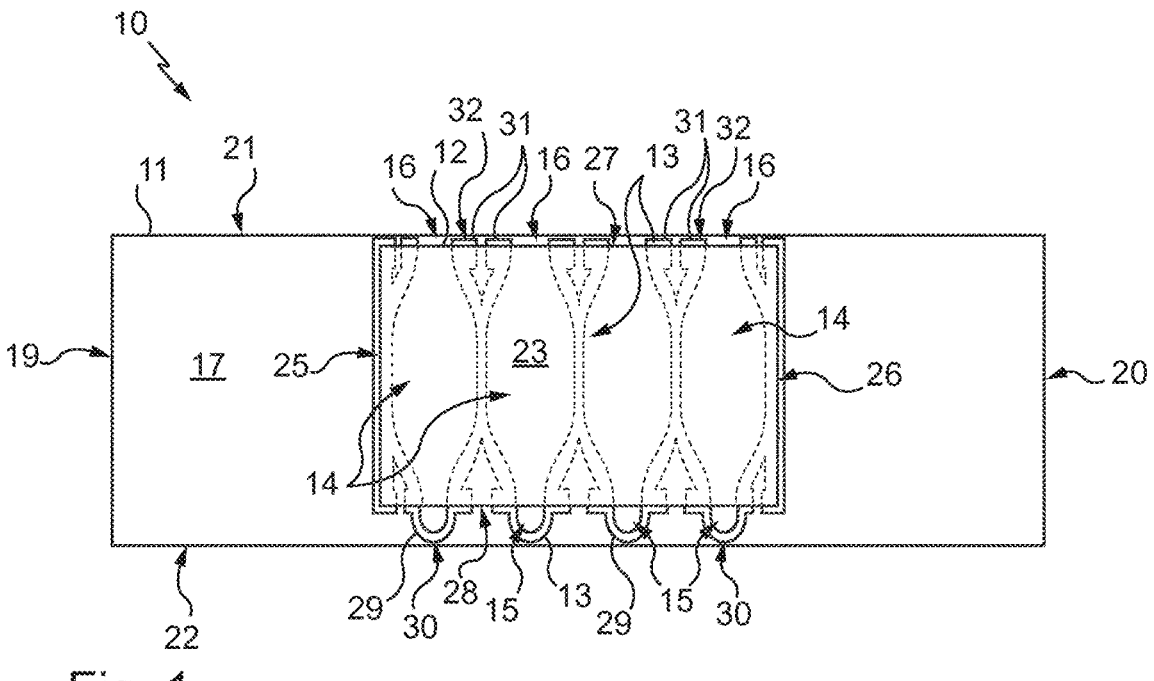
FIG. 1 is a view of a support for analysing by microscope a liquid-based biological substance, in accordance with the prior art.
Figure 2:
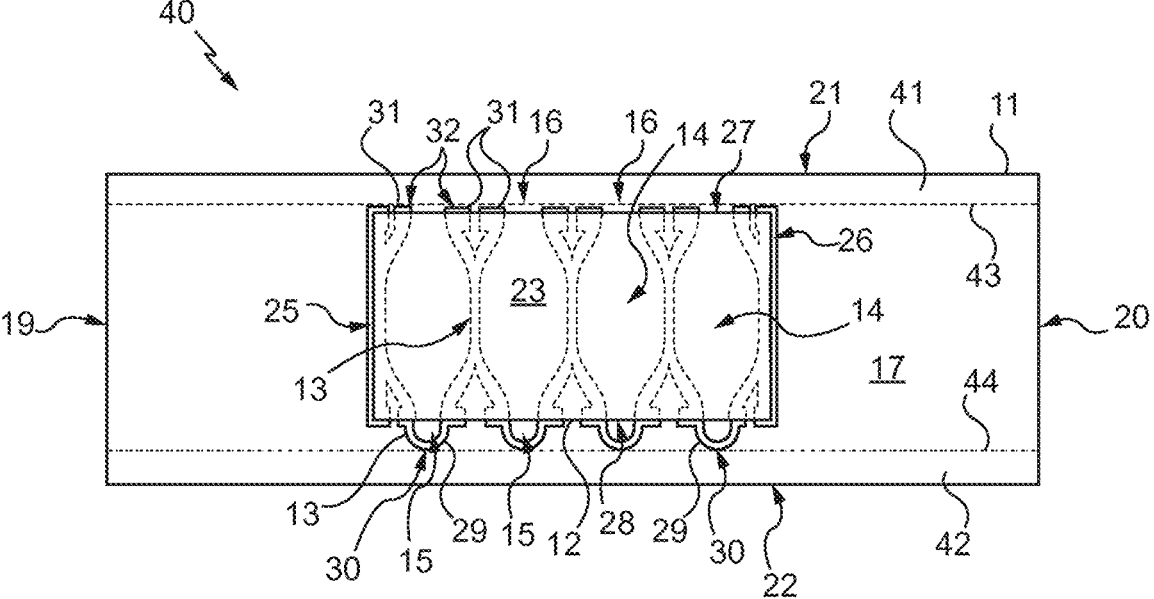
FIG. 2 is a view similar to FIG. 1, and to the same scale, of a support according to the invention.

The support 10 and the support 40 illustrated respectively on FIGS. 1 and 2 each include an object-carrying slide 11, a cover glass 12 and lines of adhesive 13 disposed between the object-carrying slide 11 and the cover glass 12 to secure them to each other while peripherally delimiting individual compartments 14.

It should be noted first that, in the present report, to simplify, the same numerical references have been used for the corresponding elements of the support 10 and of the support 40.

Consequently, in the following description of the support 10, if reference is made to an element of the support 10 that is not visible on FIG. 1, it is possible—for purposes of understanding—to refer to one of the figures illustrating the support 40 on which the corresponding element is visible.

The individual compartments 14 of the support 10 are each configured to receive a sample of the liquid-based biological substance, here animal semen, diluted or not.

The support 10 includes here individual compartments 14.

Each individual compartment 14 opens solely on one side onto a well 15 and on another side onto a vent 16, each well 15 and each vent 16 being delimited by lines of adhesive 13.

To fill an individual compartment 14 with a sample of the biological substance, a drop (not illustrated) of the substance is deposited in the respective well 15. This drop is then entrained by capillarity in the individual compartment 14 while the air initially present in the individual compartment 14 escapes through the vent 16.

The object-carrying slide 11 and the cover glass 12 are here each made from float glass covered with a surfactant film promoting the entrainment of the drop in the individual compartment 14 by capillarity.

The object-carrying slide 11 and the cover glass 12 are each transparent.

The object-carrying slide 11 is parallelepipedal and has two principal faces, namely an upper face 17 and a lower face 18 (FIGS. 3 and 4), and side faces that extend from one of the principal faces to the other, namely a left face 19, a right face 20, a front face 21 and a rear face 22.

The distance between the left face 19 and the right face 20 is greater than the distance between the front face 21 and the rear face 22, which is itself greater than the distance between the lower face 18 and the upper face 19.

The distance between the left face 19 and the right face 20 is here between 74.8 mm and 75.2 mm.

The distance between the front face 21 and the rear face 22 is here between 24.8 mm and 25.2 mm.

The distance between the lower face 18 and the upper face 19—i.e. the thickness of the object-carrying slide 11—is here approximately 1 mm.

The support 10 has a left-right direction transverse to the left face 19 and to the right face 20 while it is parallel to the front face 21, to the rear face 22 and to the principal faces 17 and 18, a front-and rear direction transverse to the front face 21 and to the rear face 22 while it is parallel to the left face 19, to the right face 20 and to the principal faces 17 and 18, and a bottom-top direction transverse to the principal faces 17 and 18 while it is parallel to the side faces 19, 20, 21 and 22.

The cover glass 12 is parallelepipedal and has two principal faces, namely an upper face 23 and a lower face 24, and side faces that extend from one of the principal faces to the other, namely a left face 25, a right face 26, a front face 27 and a rear face 28.

The distance between the left face 25 and the right face 26 is greater than the distance between the front face 27 and the rear face 28, which is itself greater than the distance between the lower face 24 and the upper face 23.

The distance between the left face 25 and the right face 26 is here between 31.8 mm and 32.2 mm.

The distance between the front face 27 and the rear face 28 is here between 20.8 mm and 21.2 mm.

The distance between the lower face 24 and the upper face 23—i.e. the thickness of the cover glass 12—is here 0.7 mm+/−0.05 mm.

The lower face 24 of the cover glass 12 is facing the upper face 17 of the object-carrying slide 11 while the front face 27, the rear face 28, the left face and the right face 26 of the cover glass 12 are turned towards and at a distance from respectively the front face 21, the rear face 22, the left face 19 and the right face 20 of the object-carrying slide 11.

The cover glass 12 is here disposed centred with respect to the object-carrying slide 11 in the left-right direction.

Each individual compartment 14 is delimited in the bottom-top direction respectively by the upper face 17 of the object-carrying slide 11 and by the lower face 24 of the cover glass 12 and delimited peripherally by the lines of adhesive 13.

The thickness of the lines of adhesive 13 is here 20 μm.

It should be noted that, on FIGS. 3 to 5 and 8, the thickness of the lines of adhesive 13 has been an exaggerated for reasons of legibility.

Each individual compartment 14 here has a capacity of 3 μl.

The individual compartments 14 follow each other in the left-right direction, here while being juxtaposed with each other.

As explained above, each individual compartment 14 opens on one side onto a well 15 and on another side onto a vent 16, the well 15 here being turned towards the rear face 22 of the object-carrying slide 11 and the vent 16 here being turned towards the front face 21 of the object-carrying slide 11.

Here all the wells 15 are turned towards the rear face 22 and all the vents 16 are turned towards the front face 21.

Each well 15 is here delimited by a portion 29 of the lines of adhesive 13 shaped in a U and extending beyond the space strictly lying between the object-carrying slide 11 and the cover glass 12 as far as an end 30 located here level with the rear face 22 of the object-carrying slide 11.

Each vent 16 is here delimited by straight portions 31 of the lines of adhesive 13 extending facing each other, each beyond the space strictly lying between the object-carrying slide 11 and the cover glass 12 and as far as a respective end 32 located here level with the front face 21 of the object-carrying slide 11.

The support 40 illustrated on FIG. 2 is similar to the support 10, except that the respective dimensions of the cover glass 12 and of the lines of adhesive 13 of the support 40 are smaller in the front-rear direction and that the upper face 17 of the object-carrying slide 11 of the support 40 is bare and uncovered over a front marginal region 41 and over a rear marginal region 42.

More precisely, the distance between the front face 27 and the rear face 28 of the cover glass 12 is here between 16.8 mm and 16.2 mm.

It should be noted that the length of the individual compartments 14 of the support 40, i.e. the distance separating the well 15 from the vent 16, which corresponds here to the distance between the front face 27 and the rear face 28 of the cover glass 12, is consequently also smaller than that of the individual compartments 14 of the support 10.

The front marginal region 41 runs along the front face 21 of the object-carrying slide 11, while the rear marginal region 42 runs along the rear face 22 of the object-carrying slide 11.

Here, the front marginal region 41 and the rear marginal region 42 are each directly bordered by the front face 21 and the rear face 22 of the object-carrying slide 11 respectively.

The front marginal region 41 here has an extension in the front-rear direction equal to 2.5 mm and has an extension in the left-right direction equal to the distance between the left face 19 and the right face 20 of the object-carrying slide 11.

The limit of the extension in the front-rear direction of the front marginal region 41 is marked on FIG. 2 by the broken line 43, where it passes level with each of the ends 32 of the vents 16.

This is because, beyond this limit 43 going towards the rear, the upper face 17 is covered by the lines of adhesive 13 and/or is located opposite the lower face 24 of the cover glass 12 and is therefore not bare and uncovered.

The rear marginal region 42 here has an extension in the front-rear direction equal to 2.6 mm and has an extension in the left-right direction equal to the distance between the left face 19 and the right face 20 of the object-carrying slide 11.

The limit of the extension in the front-rear direction of the front marginal region 42 is marked on FIG. 2 by the broken line 44, where it passes level with the ends 30 of the wells 15.

This is because, beyond this limit 44 going towards the front, the upper face 17 is covered by the lines of adhesive 13 and/or is located opposite the lower face 24 of the cover glass 12 and is therefore not bare and uncovered.

Generally, each of the front marginal region 41 and rear marginal region 42 has an extension in the front-rear direction of no more than 3 mm, or in a variant equal to more than 3 mm, for example 3.5 mm, 4 mm, 4.5 mm, 5 mm, or even more than 5 mm.

Furthermore, it should be noted that the extension in the front-rear direction of each of the wells 15—i.e. the distance, measured at the upper face 17, between the rear face 28 of the cover slide 12 and the limit 44 (which passes level with the ends 30 of the wells 15)— is here equal to 2.4 mm, which is appreciably less both than the extension in the front-rear direction of the front marginal region 41 (2.5 mm) and the extension in the front-rear direction of the rear marginal region 42 (2.6 mm).

FIGS. 3 to 5 and 8 illustrate a system 100 for analysing the liquid-based biological substance, including the support 40 and a microscope 50.

Figure 3:
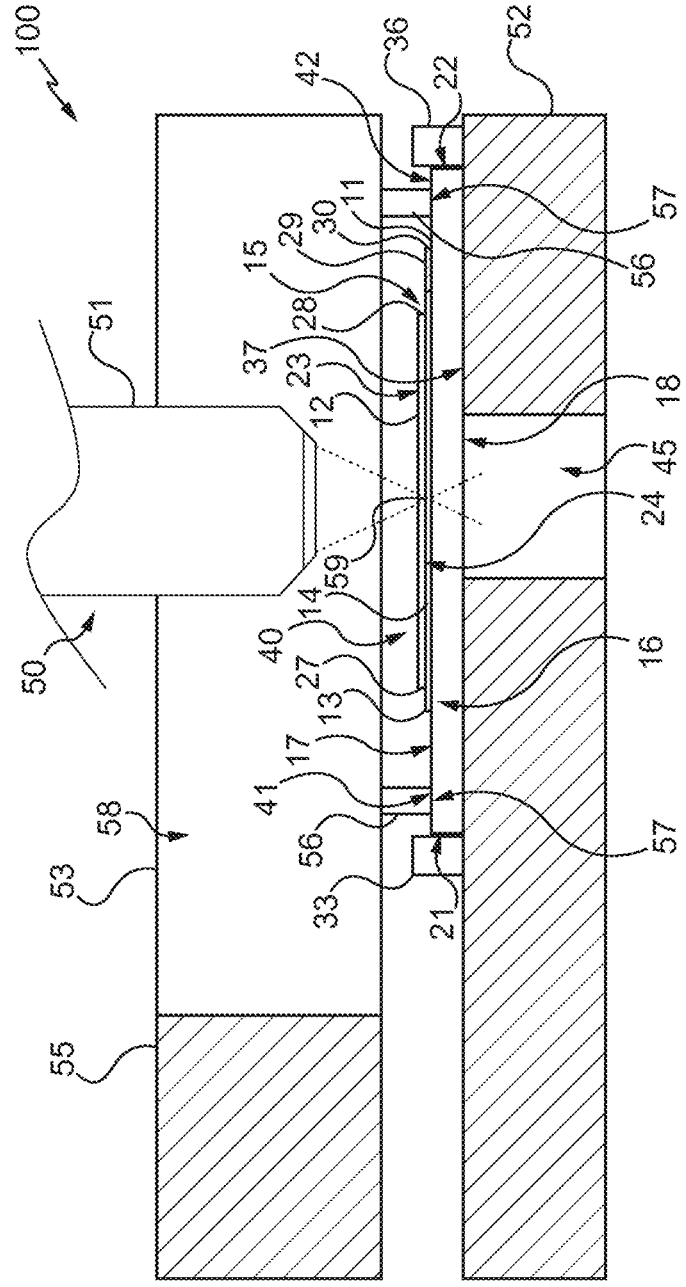
FIG. 3 is a highly schematic view in cross section of a system according to the invention (illustrated in more detail on FIGS. 9 to 12), including the support illustrated on FIG. 2 and a microscope, the system being in an observation configuration in which the support is gripped between a stage and the fingers of a support plate of the microscope with one of the individual compartments of the support aligned with the lens; the cross-section being in the front-rear direction of the support and passing through the middle of this individual compartment.
Figure 4:
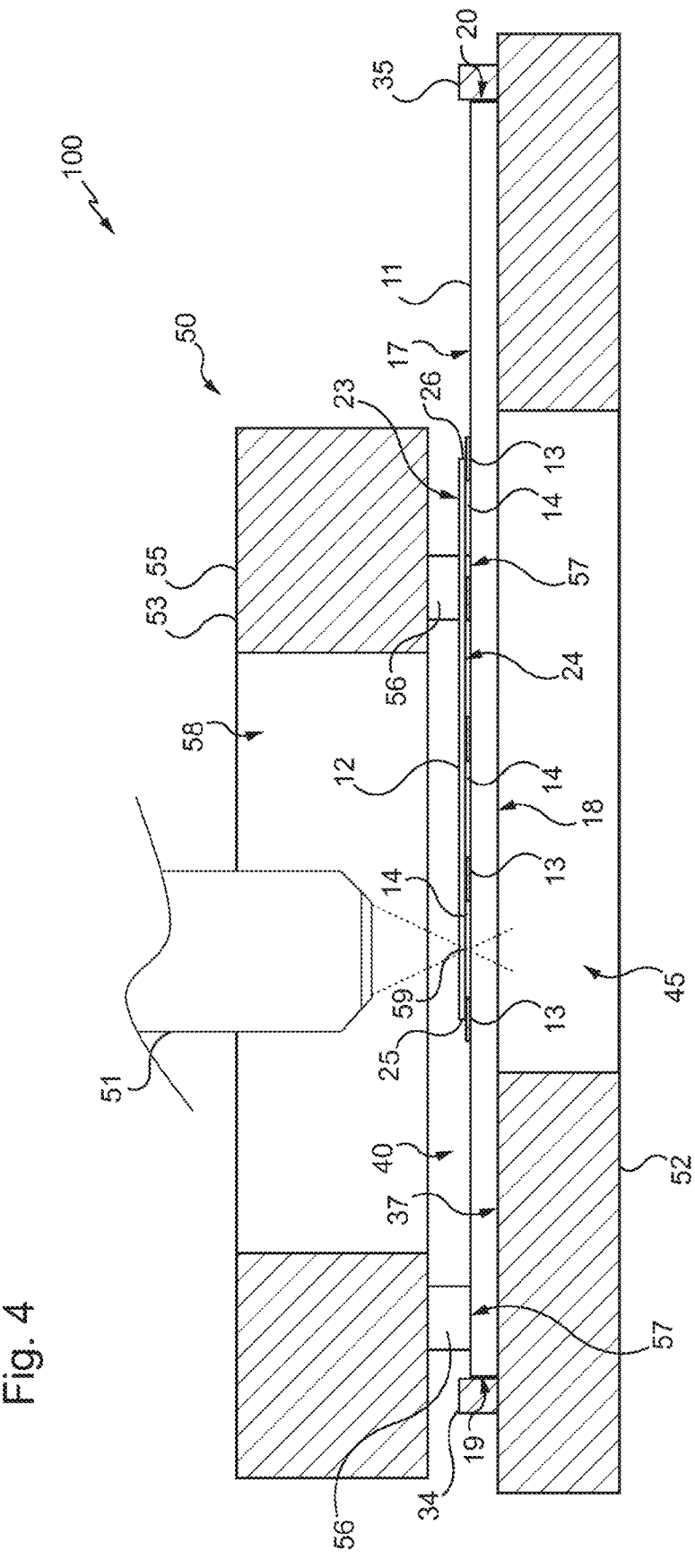
FIG. 4 is a view in cross section of the system illustrated in FIG. 3, this time in the left-right direction of the support and passing through the middle of the individual compartments.
Figure 5:
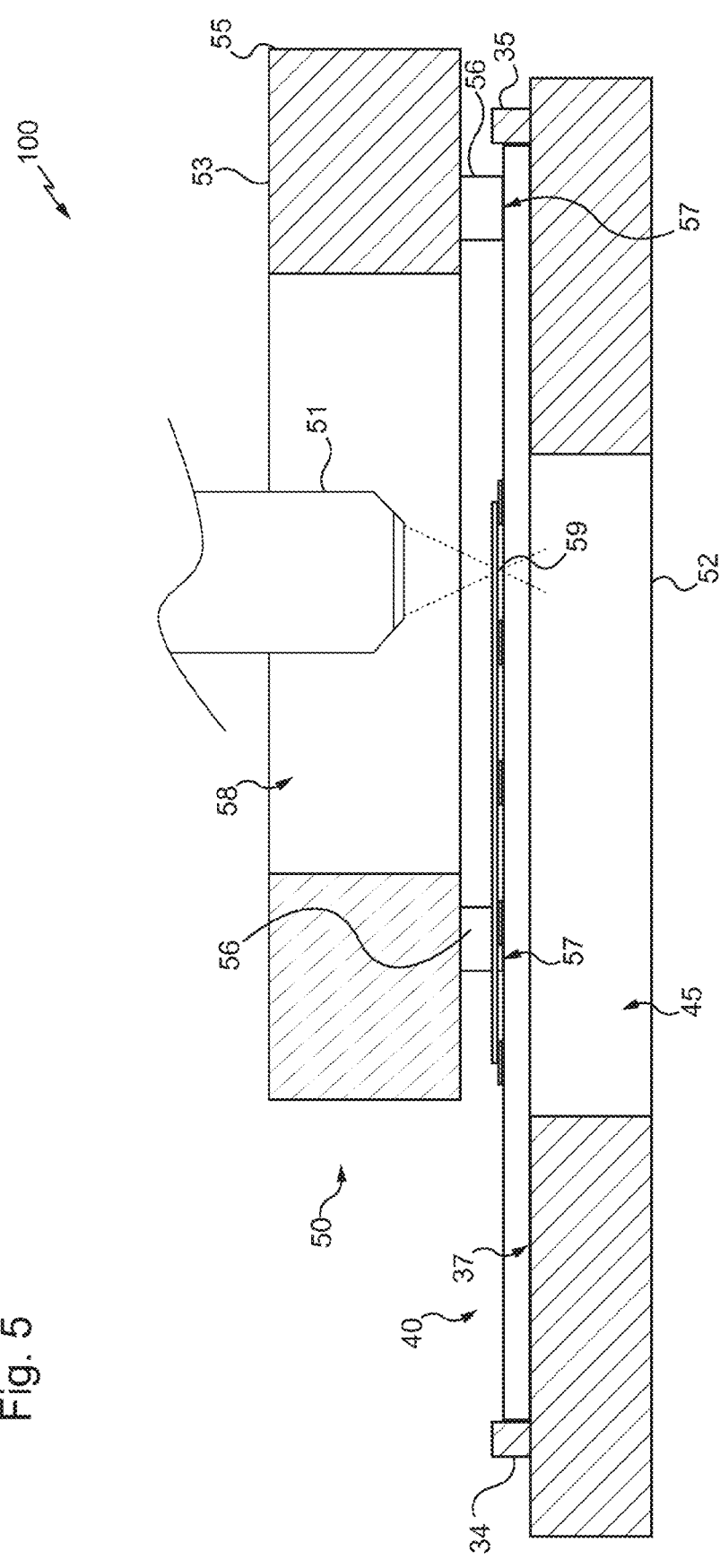
FIG. 5 is a view similar to FIG. 4 after the stage has been moved in the left-right direction to align another of the individual compartments with the lens.

On FIGS. 3 to 5, the system is in an observation configuration in which the microscope 50 is cooperating with the support 40 in order to observe the samples of biological substance contained in the individual compartments 14.

The microscope 50 includes a lens 51 and a stage 52 configured to receive the support 40 in at least one observation position in which the lower face 18 of the object-carrying slide 11 against the stage 52 and one of the individual compartments 14 aligned with the lens 51.

On FIGS. 3 and 4, the support 40 is in a first observation position in which the compartment 14 aligned with the lens 51 is the one that is seen furthest to the left on FIG. 2.

As explained in more detail below, the microscope 50 is configured to dispose the support 40 in a plurality of observation positions in each of which the stage 52 receives the support 40 with a respective individual compartment 14 aligned with the lens 51.

On FIG. 5 for example, the support 40 is in a second observation position in which the compartment 14 aligned with the lens 51 is the one that is seen furthest to the right on FIG. 2.

The microscope 50 furthermore includes a frame (not illustrated on FIGS. 3 to 5 and 8 but a mounting wall 60 of which is visible on FIGS. 9 to 11) on which the lens 51 is mounted fixed and on which the stage 52 is mounted so as to be able to move in translation in the left-right direction of the support 40 in order to be able to successively align the other individual compartments 14 with the lens 51.

The mechanical connection between the stage 52 and the frame will be described in detail subsequently, with the help of FIGS. 9 to 12.

The stage 52 is furthermore configured to receive the support 40 in a predetermined position.

To position and immobilise the support 40 in this predetermined position, the stage 52 includes here positioning stops each configured to cooperate with a respective side face of the object-carrying slide 11 that it is opposite in order to immobilise the support 40 in the direction (left-right or front-and rear depending on circumstances) transverse to this respective side face.

The positioning stops include here two front positioning stops 33 opposite the front side face 21, a left positioning stop 34 opposite the left side face 19, a right positioning stop 35 opposite the right side face 20 and two rear positioning stops 36 opposite the rear side face 22, so that the support 40 is here immobilised with respect to the stage 52 both along the front-rear axis in both directions and along the left-right axis in both directions.

The positioning stops are here formed by studs projecting from an upper face 37 of the stage 52 on which the lower face 18 of the object-carrying slide 11 rests.

The stage 52 furthermore includes a cutout 45 that extends opposite each of the individual compartments 14 and is configured to allow the light from an illuminating member (not illustrated) disposed under the stage 52 to reach each of the individual compartments 14.

The microscope 50 furthermore includes a support plate 53 that extends at least partially opposite the support 40, and a clamping member configured to urge the support plate 53 and the stage 52 towards each other, so that the support 40 is gripped between the support plate 53 and the stage 52.

The clamping member includes here magnets 54 secured to the support plate 53, while the stage 52 has magnetic properties, the magnets 54 being configured to urge the stage 52 towards the support plate 53.

The support plate 53 is mounted fixed on the frame and includes a base 55 and support fingers 56 each projecting from the base 55 towards the stage 52 as far as a distal end 57.

The distal ends 57 of the support fingers 56 are each solely in contact with the marginal regions 41 and 42 of the upper face 17 of the object-carrying slide 11.

The object-carrying slide 11 is thus gripped between the support fingers 56 and the stage 52, the object-carrying slide 11 being in contact with the support plate 53 here solely by means of the support fingers 56.

The support plate 53 here includes four fingers 56, two fingers 56 of which are in contact with the front marginal region 41 and two other fingers 56 of which are in contact with the rear marginal region 42.

The four support fingers 56 are here disposed so as to each be located at the respective vertex of an imaginary rectangle.

The base 55 furthermore has an opening 58 through which the lens 51 points onto the individual compartment 14 aligned with the lens 51, the latter here being partially received in the opening 58.

The support fingers 56 that are in contact with the front marginal region 41 are disposed on either side of the opening 58. The support fingers 56 that are in contact with the rear marginal region 42 are disposed on either side of the opening 58.

The lens 51 here has a fixed focal distance.

The system 100 is configured so that the focal point 59 of the lens 51 is here located approximately at the middle of the individual compartment 14 that is aligned with the lens 51.

When the stage 52 translates in the left-right direction of the support the support fingers 56 slide on the respective marginal regions 41 and 42, while each remaining solely in contact therewith.

Figure 6:
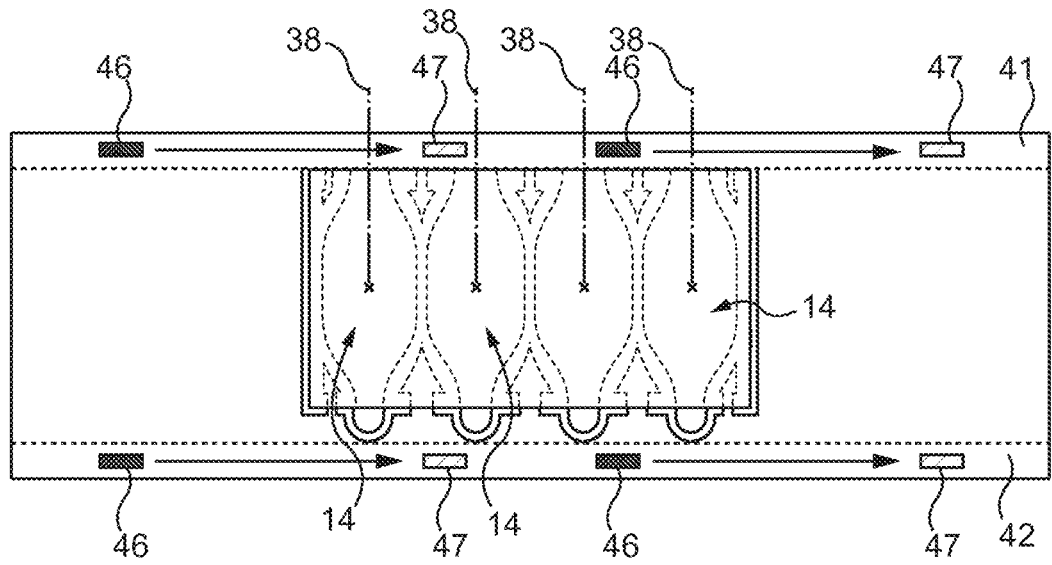
FIG. 6 is a view similar to FIG. 2 on which the axes of the individual compartments are marked, as well as the positions of the fingers of the support plate on the upper face of the object-carrying plate when the stage is in the position that it occupies in FIG. 4 and when the stage is in the position that it occupies in FIG. 5.

On FIG. 6, the axes 38 of each of the individual compartments 14 have been marked.

When an individual compartment 14 is aligned with the lens 51 to observe the sample received in this compartment 14, the axis 38 of this compartment 14 is aligned more precisely with the optical axis of the lens 51.

Consequently, between the position that it occupies on FIG. 4 and the position that it occupies on FIG. 5, the stage 52 has been moved over a distance equal to the separation between the respective axes 38 of the individual compartment 14 furthest to the left and the individual compartment 14 furthest to the right, i.e. the two individual compartments 14 furthest away from each other on the support 40.

The separation between the axes 38 of two adjacent compartments is here equal to 7.8 mm and the separation between the axes 38 of the two individual compartments 14 furthest away from each other is therefore 23.4 mm.

On FIG. 6, the respective positions of the support fingers 56 when the stage 52 is in the position that it occupies on FIG. 4 have furthermore been marked by four black rectangles 46, and the respective positions of these fingers 56 when the stage 52 is in the position that it occupies on FIG. 5 by four hatched rectangles 47.

Each black 46 or hatched 47 rectangle corresponds to the portion of the upper face 17 that is in contact with the distal end 57 of a support finger 56, this portion here having an extension in the front-rear direction equal to approximately 1 mm and an extension in the left-right direction equal to approximately 3 mm.

Figure 7:
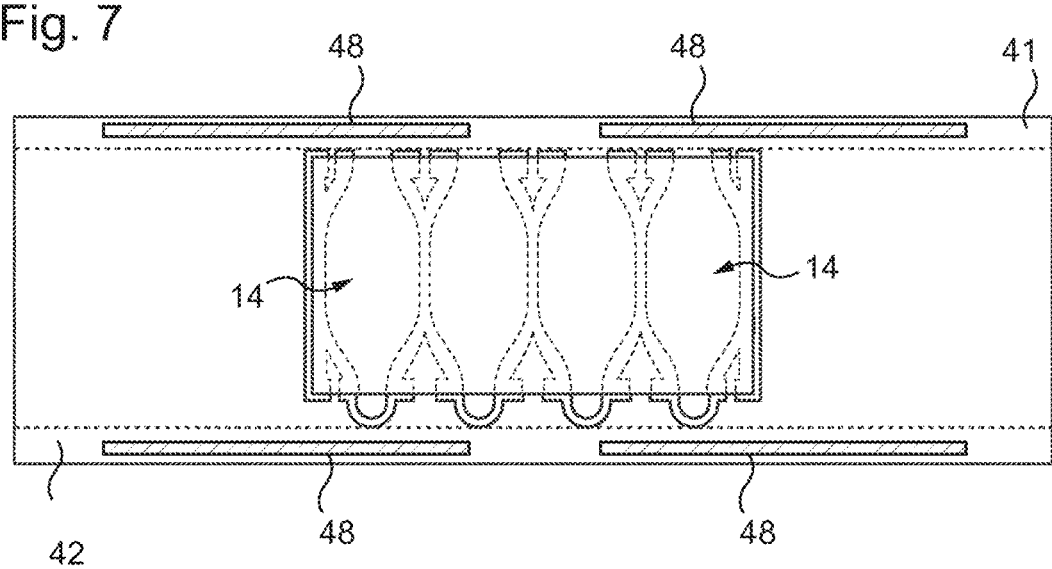
FIG. 7 is a view similar to FIG. 6, on which the path of each of the fingers of the support plate when the stage passes from the position that it occupies on FIG. 4 to the position that it occupies on FIG. 5 are marked.

On FIG. 7, the path of each of the support fingers 56 when the stage 52 passes from the position that it occupies on FIG. 4 to the position that it occupies on FIG. 5 has furthermore been marked by hatched rectangles 48.

Each hatched rectangle 48 therefore corresponds to the whole of the respective rectangle 46 and 47 on the whole of the path of the corresponding FIG. 56. Each rectangle 48 therefore here has an extension in the front-rear direction equal to approximately 1 mm and an extension in the left-right direction equal to approximately 3 mm with the length of the path of the finger 56 added, the latter length being—as explained above—equal to the separation between the respective axes 38 of the individual compartment 14 furthest to the left and the individual compartment 14 furthest to the right, i.e. the two individual compartments 14 furthest away from each other on the support 40.

It should be noted that, for each support finger 56 to be able to remain entirely in contact with the respective marginal region 41 or 42 that it travels over, whatever the individual compartment 14 that is aligned with the lens 51, the extension of this marginal region in the left-right direction must be at least equal to the extension of the hatched rectangles 48 in the left-right direction.

It should also be noted that the extension in the left-right direction of the hatched rectangles 48 is in practice greater than the separation between the respective axes 38 of the two individual compartments 14 furthest away from each other on the support 40 (since account must be taken of the extension of the support fingers in the left-right direction).

It should also be noted that, on FIG. 7, the hatched rectangles 48 of one of the same marginal region 41 or 42 do not intersect, so that a covering could be present between these two rectangles 48 without being encountered by a support finger 56 during its travel. Thus, in a variant that is not illustrated, the support has two front marginal regions and/or two rear marginal regions as described above but each with a lesser extension in the left-right direction, and with a covering interposed between these two front marginal regions and/or between these two rear marginal regions.

Figure 13:
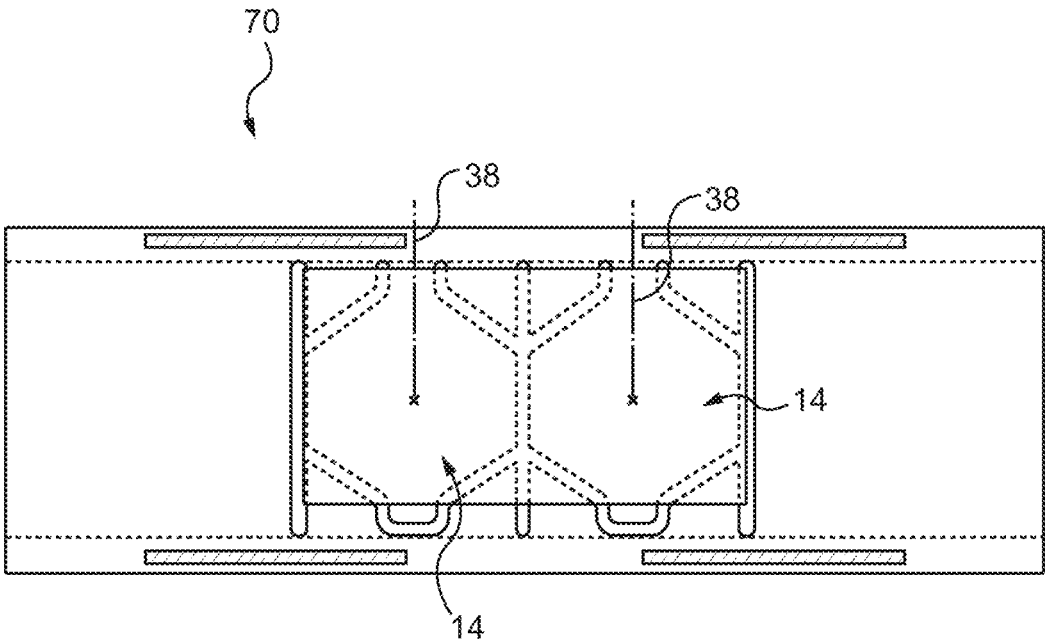
FIG. 13 is a view similar to FIG. 7 for a variant of the support according to the invention.

The support 70 illustrated at FIG. 13 is similar to the support 40 except that it includes only two individual compartments 14, the separation between the axes 38 of these compartments being in this case equal to 15.84 mm.

Figure 8:
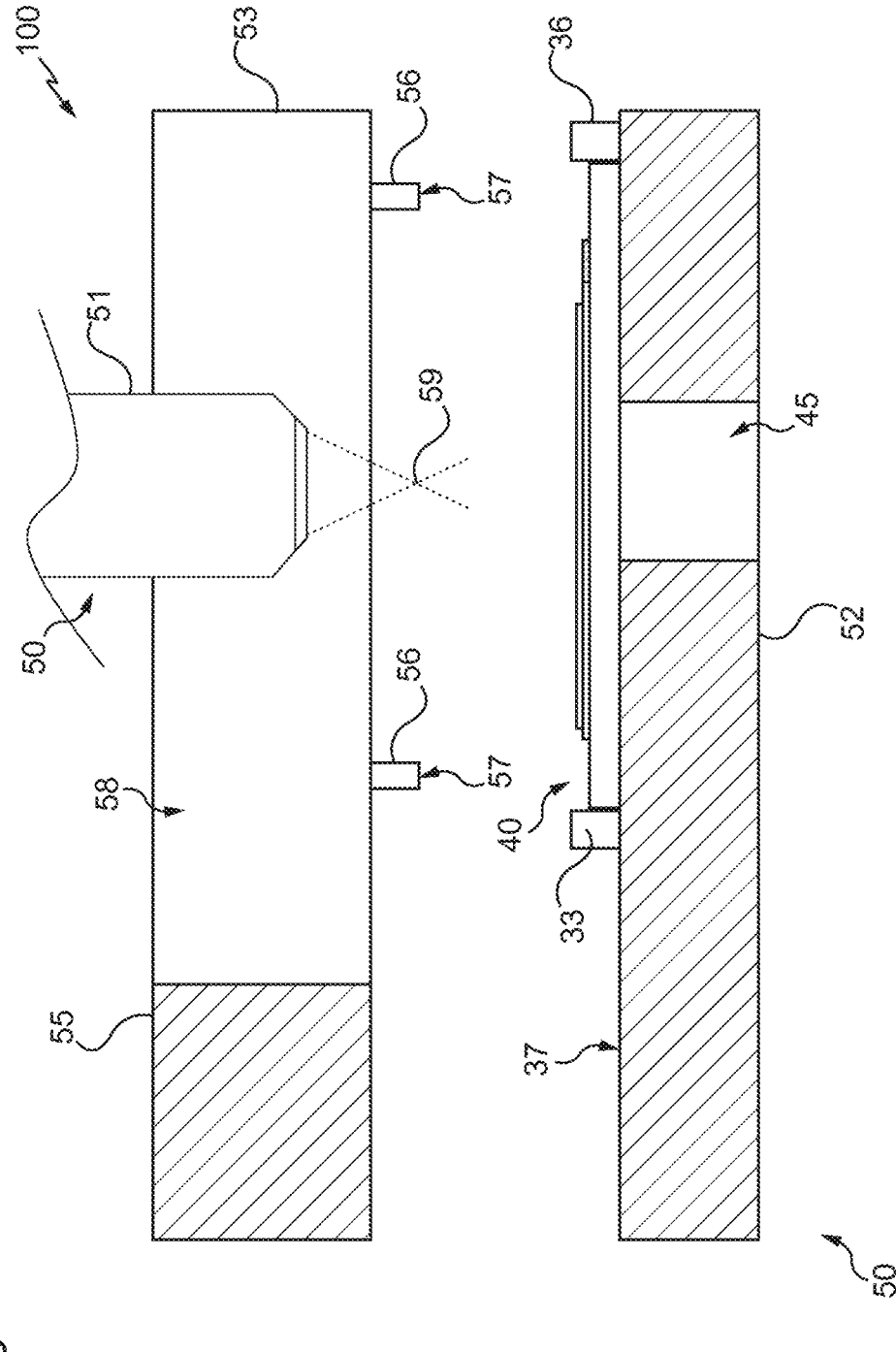
FIG. 8 is a view similar to FIG. 3 after the stage has been moved away from the support plate to change the system into a loading/unloading configuration in which the support is accessible to a user of the system.
Figure 9:
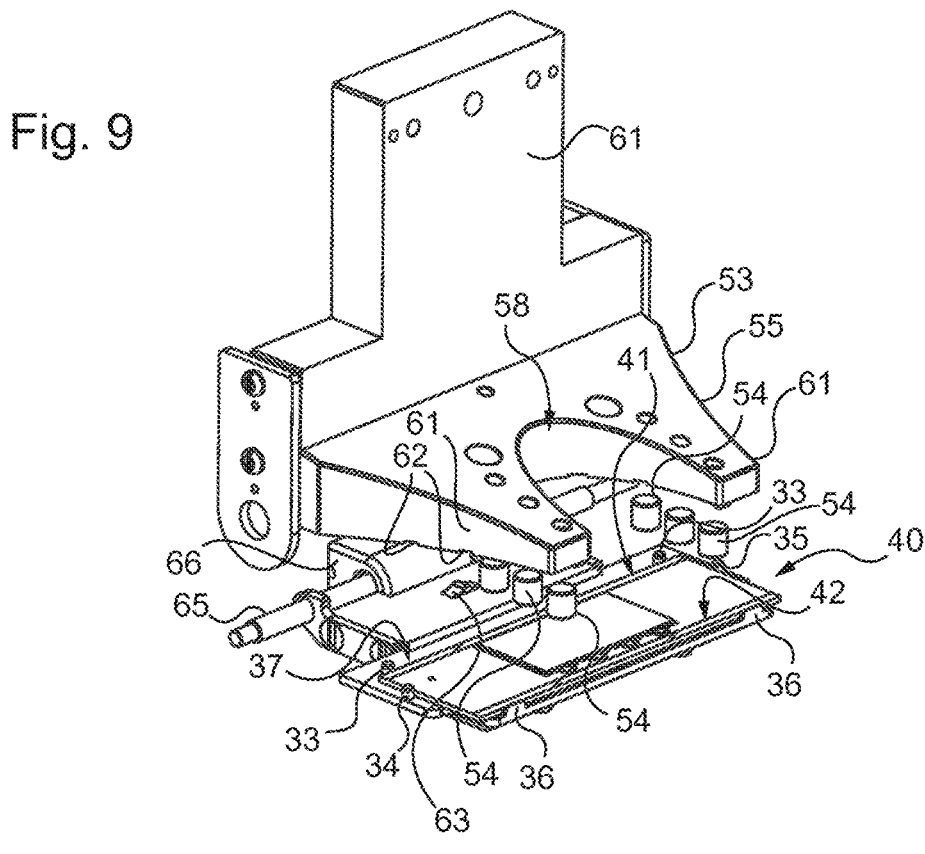
FIG. 9 is a detailed view in exploded perspective of the system illustrated schematically on FIGS. 2 to 8, but without the lens.

FIG. 8 illustrates a loading/unloading configuration of the system 100, here obtained after the stage 52 has been separated from the support plate 53, the support 40 then being accessible to a user in order to be removed from the stage 52 and optionally replaced by another similar support in order to analyse the samples contained in the compartments of this other support.

Conversely, to change the system 100 from the loading/unloading configuration to the observation configuration, the stage 52 loaded with the support 40 is moved closer to the support plate 53 until each support finger 56 is in contact with the marginal regions 41 and 42 as described previously.

The system 100 will now be described in more detail with the help of FIGS. 9 to 12.

The frame includes here a mounting wall 60 and the base 55 includes two arms 61 each projecting transversely from the mounting wall 60. The arms 61 extend opposite each other while delimiting the opening 58.

Figure 12:
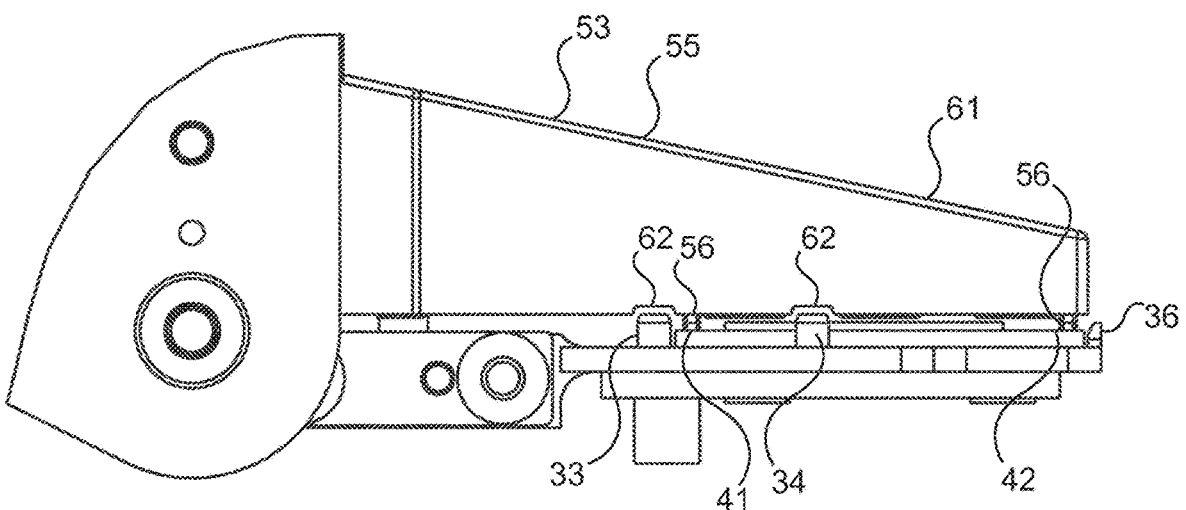
FIG. 12 is a side view of a part of the system illustrated in FIGS. 9 and 11, the system being in the observation configuration shown schematically on FIGS. 3 to 5.

Each arm 61 is here provided with two support fingers 56, one finger 56 of which is in contact with the front marginal region 41 and one finger of which is in contact with the rear marginal region 42 when the system 100 is in the observation configuration (FIG. 12).

Figure 10:
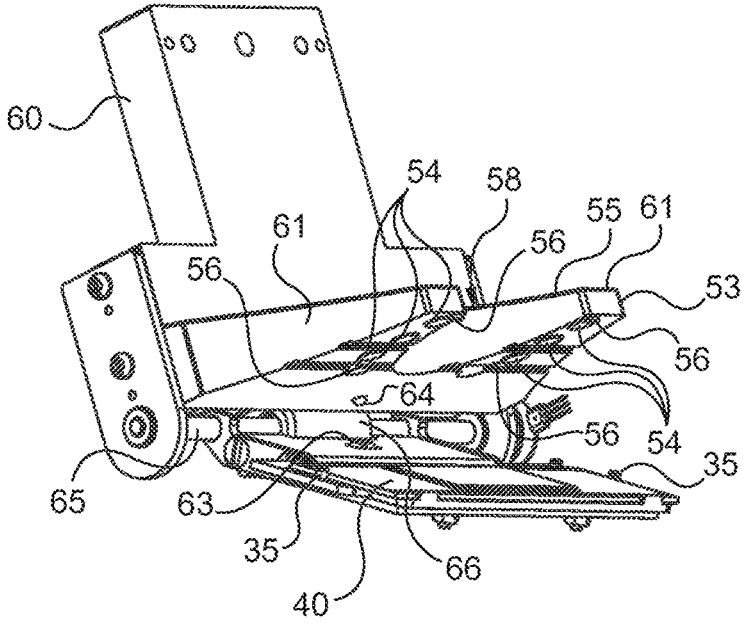
FIG. 10 is a view similar to FIG. 9 but for the system in the assembled state, and in a cleaning configuration in which the stage is very far away from the support plate.

As can be seen clearly on FIG. 10, the magnets 54 of the clamping member are here housed in the arms 61, each arm 61 being here provided with three cylindrical magnets 54. For each arm 61, the magnets 54 are here distributed between the support fingers 56 of this arm 61.

The support plate 53 here has guide grooves 62 provided in the base 55, on the same side as the support fingers 56, each guide groove 62 being configured to receive an end portion of a respective stud forming one of the front 33, left 34 and/or right 35 positioning stops of the stage 52 when the system 100 is in the observation configuration, the ends of the studs moving in the respective guide groove when the stage 52 moves in the left-right direction.

The guide grooves 62 thus participate in the correct positioning of the stage 52 in the front-rear direction of the support 40, i.e. so that the support fingers 56 remain solely in contact with the marginal regions 41 and 42 when the stage 52 moves.

Figure 11:
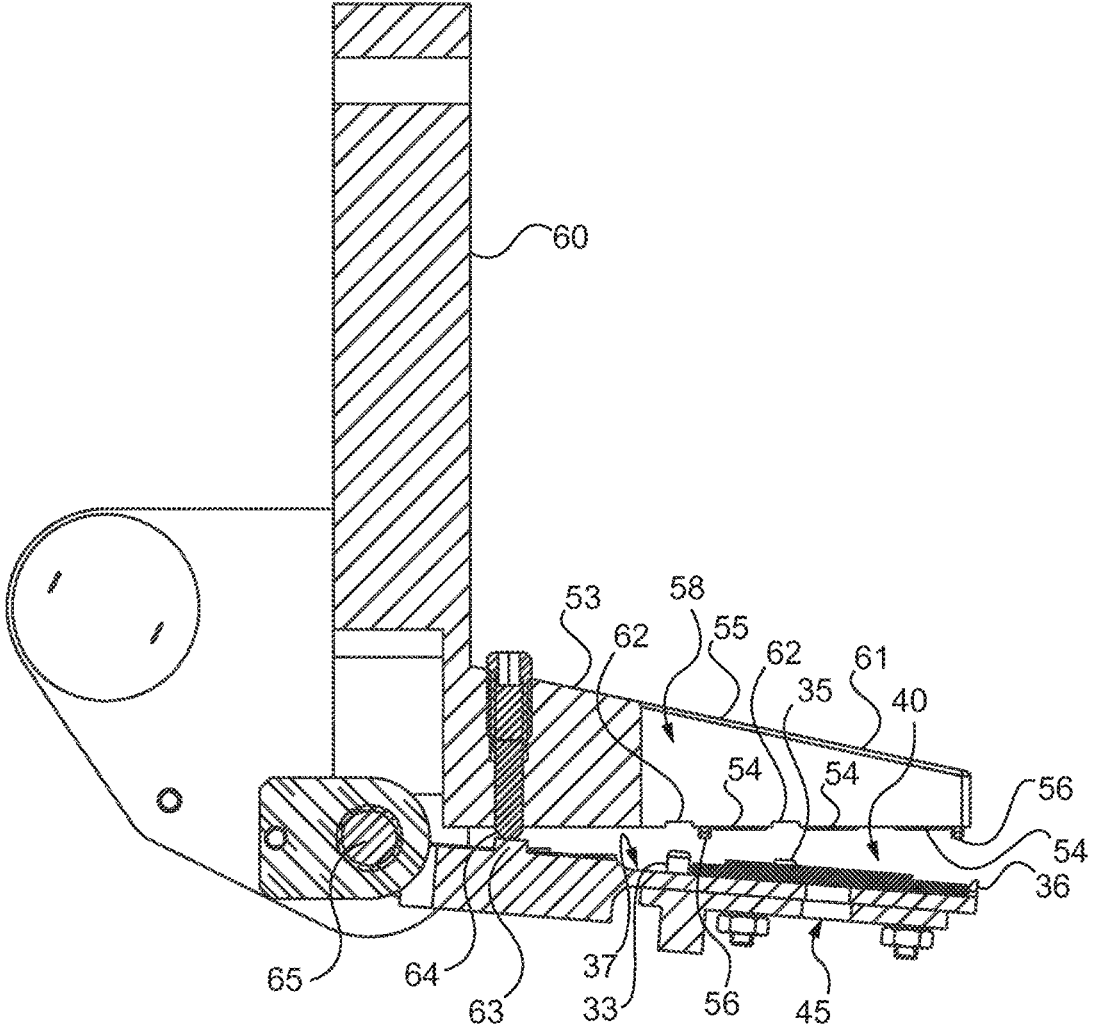
FIG. 11 is a view in cross section of the system as illustrated in FIGS. 9 and 10, taken in the front-rear direction of the support and passing through one of the individual compartments, the system being in the loading/unloading configuration shown schematically in FIG. 8.

The stage 52 furthermore has a ramp 63 and the support plate 53 has a protrusion 64 configured to cooperate with the ramp 63 during the translation movement of the stage 52 in the left-right direction of the support 40 so as to move the stage 52 away from the support plate 53, counter to the force exerted by the clamping member, here until the stage arrives in the position illustrated on FIG. 11, where the system 100 is in its loading/unloading configuration.

The stage 52 is here mechanically connected to the frame by a sliding pivot connection including a cylindrical guide 65 and a barrel 66 mounted for sliding on the guide 65, the latter being longitudinally oriented in a direction parallel to the left-right direction of the support 40 when the latter is received in its predetermined position on the stage 52.

Such a mechanical connection makes it possible to move the stage 52 both further away from and closer to the support plate 53 and to move the stage 52 in the left-right direction.

The guide 65 is here attached to the mounting wall 60 while the barrel 66 is secured to the stage 52.

The inside diameter of the barrel 66 is here slightly greater than the outside diameter of the guide 65 so that there is between them a clearance enabling the stage 52 to pivot to a certain extent both on the left-right axis in both directions and on the front-rear axis in both directions.

This ability of the stage 52 to pivot makes it possible to adjust the inclination of the upper face 17 of the object-carrying slide 11 with respect to the support fingers 56 in order to ensure that the latter are all in contact with the upper face 17, with an equitably distributed support between all the fingers 56.

To move the stage 52 in the left-right direction, the microscope 50 furthermore includes here a motorised mechanism (not illustrated) controlled from a user interface. In a variant, the mechanism is not motorised and is actuated manually by means of a knob.

The system 100 as described above is in particular adapted for an analysis including a step of counting the spermatozoa present in the samples of animal semen, with a view to determining the concentration thereof.

In a variant that is not illustrated, the system 100 is coupled to a computer configured to automatically analyse the images captured by the lens in order to implement the counting step and to determine the concentration.

In a variant that is not illustrated, the focal point of the lens is not at the middle of the individual compartments but is located—in the bottom-top direction—at a predetermined distance from the middle of the individual compartments.

In a variant that is not illustrated, the lens is mounted so as to be able to move with respect to the frame of the microscope between a plurality of fixed predetermined positions in each of which the lens is located at a different respective distance from the support.

Naturally, in the present application, the term lens must be understood in a broad sense and may in particular be a simple electronic image sensor, such as for example a CMOS sensor, used for example in so-called "lensless" microscopy, using for example the principle of in-line holography. Thus, in a variant, the analysis system as described above is provided with a camera equipped with an electronic sensor, and is configured to record and process a succession of images in order to analyse the biological substance, for example to determine the motility of the spermatozoa contained in samples of animal semen.

In another variant that is not illustrated, the front marginal band and the rear marginal band are located at a short distance from the front face 21 or from the rear face 22 respectively, i.e. for example a covering or a portion of covering is located on the upper face 17 between the front face 21 and the front marginal region and/or between the rear face 22 and the rear marginal region.

In yet another variant that is not illustrated, the support plate includes three support fingers, with—when the system is in the holding configuration—two of the fingers being solely in contact with one of the front and rear marginal regions and the last of the fingers being solely in contact with the other one of the front and rear marginal regions.

In yet another variant that is not illustrated, the clamping member includes magnets that are secured to the stage while the support plate has magnetic properties.

In yet another variant that is not illustrated, the positioning stops are different from studs projecting from the upper face 37 of the stage 52 and are for example formed by the edges of a hollow provided in this upper face 37 and configured to accommodate the object-carrying slide 11.

In yet other variants that are not illustrated, the wells and the vents are disposed differently from what is described above, for example all the wells are turned towards the front face and all the vents are turned towards the rear face, or from one compartment to another the wells and the vents are in alternation turned towards the front face and then towards the rear face.

In other variants that are not illustrated:

the lens has a variable focal distance rather than fixed;

the number of individual compartments is different from four and two, for example three, five or more than five;

the clamping member includes a number of magnets different from three per arm, for example one, two, four or more than four magnets per arm, and/or the magnets have a shape different from cylindrical, for example parallelepipedal;

the clamping member is different from magnets housed in the arms of the support plate, and includes for example springs disposed on the stage side that look in the opposite direction to the support plate and are configured to push the stage towards the support plate; and/or the ramp 63 is carried by the support plate and the protrusion 64 is carried by the stage.

Many other variants are possible according to circumstances and in this regard it is stated that the invention is not limited to the examples described and shown.

The invention claimed is:

1. A support for analysing by microscope a liquid-based biological substance, including an object-carrying slide, a cover glass and lines of adhesive disposed between the object-carrying slide and the cover glass to secure them to each other while peripherally delimiting individual compartments for receiving a sample of said biological substance; the object-carrying slide being parallelepipedal and having two principal faces, namely an upper face and a lower face, and side faces that extend from one of the principal faces to the other, namely a left face, a right face, a front face and a rear face, with the distance between the left face and the right face that is greater than the distance between the front face and the rear face, which is itself greater than the distance between the lower face and the upper face; said support having a left-right direction transverse to the left face and to the right face while it is parallel to the front face, to the rear face and to the principal faces, a front-rear direction transverse to the front face and to the rear face while it is parallel to the left face, to the right face and to the principal faces, and a bottom-top direction transverse to the principal faces while it is parallel to the side faces; the cover glass being parallelepipedal and having two principal faces, namely an upper face and a lower face, and side faces that extend from one of the principal faces to the other, namely a left face, a right face, a front face and a rear face; the lower face of the cover glass being facing the upper face of the object-carrying slide while the front face, the rear face, the left face and the right face of the cover glass are turned towards and at a distance from respectively the front face, the rear face, the left face and the right face of the object-carrying slide; each said individual compartment being delimited in the bottom-top direction respectively by the upper face of the object-carrying slide and by the lower face of the cover glass and delimited peripherally by said lines of adhesive, each said individual compartment opening solely on one side onto a well and on another side on to a vent, each well and each vent being delimited by said lines of adhesive, each well being turned towards one of the front face and rear face of the object-carrying slide and each vent being turned towards the other one of the front face and rear face of the object-carrying slide; wherein the upper face of the object-carrying slide is bare and uncovered over at least a front marginal region and over at least a rear marginal region, the front marginal region running along the front face of the object-carrying slide, the rear marginal region running along the rear face of the object-carrying slide, each of said front marginal region and rear marginal region having an extension in the front-rear direction at least equal to 2.5 mm and an extension in the left-right direction at least equal to the separation between the respective axes of the two individual compartments furthest away from each other and no more than the distance between the left face and the right face of the object-carrying slide.

2. The support according to claim 1, wherein, for at least one of the front marginal region and rear marginal region, the extension in the left-right direction is equal to the distance between the left face and the right face of the object-carrying slide.

3. The support according to claim 1, wherein each well has an extension in the front-rear direction that is less than the extension in the front-rear direction of each of said front marginal region and rear marginal region.

4. The support according to claim 1, wherein the distance between the left face and the right face of the object-carrying slide is between 74.8 mm and 75.2 mm, the distance between the front face and the rear face of the object-carrying slide is between 24.8 mm and 25.2 mm, the distance between the left face and the right face of the cover glass is between 31.8 mm and 32.2 mm, and the distance between the front face and the rear face of the cover glass is between 16.8 mm and 16.2 mm.

5. The support according to claim 1, wherein all the wells are turned towards one of the front face and rear face of the object-carrying slide and all the vents are turned towards the other one of the front face and rear face of the object-carrying slide.

6. A system for analysing a liquid-based biological substance, including a support according to claim 1 and a microscope including a lens, a stage configured to receive the support in a first observation position in which the lower face of the object-carrying slide is against the stage and one of the individual compartments is aligned with the lens, a frame on which the lens is mounted in at least one fixed predetermined position and on which the stage is mounted so as to be able to move in translation in the left-right direction of the support in order to be able to successively align the other individual compartments with the lens, a support plate at least partially extending opposite the support, and a clamping member configured to urge the support plate and the stage towards each other so that the support is gripped between the support plate and the stage; the support plate being mounted fixed on the frame and including a base and support fingers projecting from the base towards the stage and the distal ends of which are in contact with the marginal regions exclusively, with at least two support fingers on one of the front marginal region and rear marginal region and at least one support finger on the other of the front marginal region and rear marginal region; the stage having positioning stops for immobilising the support with respect to the stage in the left-right direction.

7. The system according to claim 6, wherein the support plate includes four support fingers, two support fingers of which are in contact with the front marginal region and two other support fingers of which are in contact with the rear marginal region.

8. The system according to claim 6, wherein one of the stage and support plate has magnetic properties and the clamping member includes magnets secured to the other one of the stage and support plate.

9. The system according to claim 6, wherein the base has an opening through which the lens points to said individual compartment aligned with the lens in said first observation position, at least two of the support fingers that are in contact with one and the same marginal region being disposed on either side of the opening.

10. The system according to claim 9, wherein the frame includes a mounting wall and the base includes two arms each projecting transversely from the mounting wall, extending facing each other and delimiting the opening, each arm being provided with two support fingers, including one finger in contact with the front marginal region and one finger in contact with the rear marginal region.

11. The system according to claim 10, wherein the clamping member includes magnets housed in said arms.

12. The system according to claim 6, wherein one of the stage and support plate has a ramp and the other one of the stage and support plate has a protrusion configured to cooperate with the ramp during the translation movement of the stage in the left-right direction so as to separate the stage from the support plate, counter to the force exerted by the clamping member, to a position in which the support is accessible for being able to be removed from the stage.

13. The system according to claim 6, wherein the stage is mechanically connected to the frame by a sliding pivot connection including a cylindrical guide longitudinally oriented in the left-right direction, and a barrel mounted for sliding on the guide, with a clearance between the barrel and the guide.

14. The system according to claim 6, wherein the lens has a fixed focal distance.

15. A method of analyzing the liquid-based substance, wherein the liquid-based biological substance is animal semen, the method comprising a step of counting spermatozoa using the system according to claim 6.

* * * * *